United States Patent
McGloughlin (10) Patent No.: US 7,136,870 B1
(45) Date of Patent: Nov. 14, 2006

(54) METHOD AND APPARATUS FOR ACCESSING AND DISPLAYING MULTIMEDIA CONTENT

(75) Inventor: Stephen D. McGloughlin, Elk Grove, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/262,172

(22) Filed: Mar. 3, 1999

Related U.S. Application Data (60) Provisional application No. 60/076,771, filed on Mar. 4, 1998.

(51) Int. Cl.
G06F 7/00 (2006.01)
G06F 17/30 (2006.01)

(52) U.S. Cl. ............... 707/104.1; 707/7; 707/101; 707/10; 345/781

(58) Field of Classification Search ............ 707/1–10, 707/501, 104.1; 709/236; 704/233
See application file for complete search history.

(56) References Cited

U.S. PATENT DOCUMENTS

| | | | |
|---|---|---|---|
| 5,291,602 A | | 3/1994 | Barker et al. |
| 5,299,304 A | | 3/1994 | Williams et al. |
| 5,530,852 A | | 6/1996 | Meske, Jr. et al. |
| 5,544,354 A | * | 8/1996 | May et al. ............. 707/4 |
| 5,557,722 A | | 9/1996 | DeRose et al. |
| 5,559,707 A | * | 9/1996 | DeLorme et al. ........ 701/200 |
| 5,613,057 A | | 3/1997 | Caravel |
| 5,642,171 A | | 6/1997 | Baumgartner et al. |
| 5,664,208 A | | 9/1997 | Pavley et al. |
| 5,664,218 A | | 9/1997 | Kim et al. |
| 5,666,554 A | * | 9/1997 | Tanaka ............. 715/500.1 |
| 5,675,511 A | | 10/1997 | Prasad et al. |
| 5,708,845 A | * | 1/1998 | Wistendahl et al. ........ 707/501 |
| 5,745,782 A | * | 4/1998 | Conway ............. 707/500.1 |
| 5,764,908 A | * | 6/1998 | Shoji et al. ............. 709/217 |
| 5,765,152 A | * | 6/1998 | Erickson ............. 707/9 |
| 5,822,537 A | * | 10/1998 | Katseff et al. ............. 707/500 |
| 5,873,080 A | * | 2/1999 | Coden et al. ............. 707/3 |
| 5,903,892 A | * | 5/1999 | Hoffert et al. ........... 707/104.1 |
| 5,905,492 A | * | 5/1999 | Straub et al. ............. 345/744 |
| 5,937,404 A | * | 8/1999 | Csaszar et al. ............. 707/9 |
| 5,983,218 A | * | 11/1999 | Syeda-Mahmood ........... 707/3 |
| 5,983,236 A | * | 11/1999 | Yager et al. ............. 707/104.1 |
| 5,987,510 A | * | 11/1999 | Imai et al. ............. 709/219 |
| 5,996,000 A | * | 11/1999 | Shuster ............. 707/104.1 |
| 5,996,015 A | * | 11/1999 | Day et al. ............. 709/226 |
| 6,012,068 A | * | 1/2000 | Boezeman et al. ........ 707/104.1 |
| 6,038,545 A | * | 3/2000 | Mandeberg et al. ........ 705/15 |
| 6,061,054 A | * | 5/2000 | Jolly ............. 707/501 |
| 6,061,695 A | * | 5/2000 | Slivka et al. ............. 707/513 |
| 6,081,262 A | * | 6/2000 | Gill et al. ............. 715/500.1 |
| 6,100,881 A | * | 8/2000 | Gibbons et al. ............. 707/101 |
| 6,199,076 B1 | * | 3/2001 | Logan et al. ............. 707/501 |
| 6,230,173 B1 | * | 5/2001 | Ferrel et al. ............. 707/501.1 |
| 6,243,761 B1 | * | 6/2001 | Mogul et al. ............. 709/217 |
| 6,282,549 B1 | * | 8/2001 | Hoffert et al. ............. 707/104 |

(Continued)

Primary Examiner—Jean Corrielus
Assistant Examiner—Anh Ly
(74) Attorney, Agent, or Firm—John P. O'Banion (57) ABSTRACT

A multimedia delivery engine and associated database for accessing and displaying varied multimedia content, whether stored on local storage devices or stored remotely on an Internet server, as one seamless multimedia application.

35 Claims, 12 Drawing Sheets

Microfiche Appendix Included
(1 Microfiche, 24 Pages)

U.S. PATENT DOCUMENTS

| | | |
|---|---|---|
| 6,347,398 B1 * | 2/2002 | Parthasarathy et al. ..... 707/203 |
| 6,374,260 B1 * | 4/2002 | Hoffert et al. ........... 707/104.1 |
| 6,389,467 B1 * | 5/2002 | Eyal ........................... 709/223 |
| 6,405,166 B1 * | 6/2002 | Huang et al. ................ 704/246 |
| 6,421,692 B1 * | 7/2002 | Milne et al. ............. 715/500.1 |
| 6,452,609 B1 * | 9/2002 | Katinsky et al. ............ 709/219 |
| 6,546,405 B1 * | 4/2003 | Gupta et al. ................. 707/512 |
| 6,683,649 B1 * | 1/2004 | Anderson .............. 348/333.05 |
| 2002/0056082 A1 * | 5/2002 | Hull et al. ...................... 725/1 |
| 2003/0009494 A1 * | 1/2003 | Milne et al. ............. 707/500.1 |
| 2004/0090466 A1 * | 5/2004 | Loveria, III ................ 345/781 |
| 2004/0128514 A1 * | 7/2004 | Rhoads ....................... 713/176 |

* cited by examiner

METHOD AND APPARATUS FOR ACCESSING AND DISPLAYING MULTIMEDIA CONTENT

CROSS-REFERENCE TO RELATED APPLICATIONS

This application claims priority from U.S. provisional application Ser. No. 60/076,771 filed on Mar. 4, 1998.

STATEMENT REGARDING FEDERALLY SPONSORED RESEARCH OR DEVELOPMENT

Not Applicable

REFERENCE TO A MICROFICHE APPENDIX

A microfiche appendix is attached. The total number of microfiche is one (1) and the total number of frames is twenty-four (24).

NOTICE OF MATERIAL SUBJECT TO COPYRIGHT PROTECTION

All of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever.

BACKGROUND OF THE INVENTION

1. Field of the Invention

The present invention pertains generally to multimedia methods and devices, and more particularly to a multimedia delivery apparatus and method where media content from varied sources is accessed as a single seamless application.

2. Description of the Background Art

Many multimedia presentations rely on the use of computers. The computer may access and display media content from a single source, or from a variety of sources such as multiple mass storage devices and the Internet. Where media content from a variety of sources is displayed, however, the computer typically relies on individual components or programs operating independently to display the media content, and does not provide for any integration of the applications. Therefore, the simultaneous presentation of content elements is not seamless, and is displayed in a non-integrated fashion. In order to make content from a variety of sources appear as though it was from a single multimedia application for providing a more effective presentation, there is a need for a multimedia presentation engine for delivery of multimedia of varied content, wherein high-bandwidth media can be stored on local devices, and current and time-sensitive content can be stored remotely, such as on an Internet server, and wherein the varied content can be pulled together as one seamless multimedia application. The present invention satisfies that need, as well as others, and overcomes the deficiencies found in conventional multimedia presentation systems and methods.

BRIEF SUMMARY OF THE INVENTION

The present invention generally pertains to computer software executed on a computer which functions as a "multimedia delivery engine". By way of example, and not of limitation, the invention implements the following two core processes which are embodied in a computer program executed on a conventional programmed data processor:

(a) the program stores media content for the subject matter to be presented in a database file and stores references within the database to the media files located on disk or on the Internet; and (b) the media content is then accessed by the program reading a content page record. This "reader" part of the program locates and displays all of the other media elements referred to in that record (such as video, audio, animation and images), and displays the HTML content of the record as text in a display window. The displaying process functions as follows:

1. The program receives an instruction to locate and access a particular database record or Web page.

2. In the case of a database record, the program locates that record and then writes the HTML text content of that record to a pre-named temporary cache file which the display window shows to the user. Since the content conforms to HTML specifications, this enables the use of graphics and hyperlinks in the display window. Having read and displayed the program-generated HTML temporary file, the program continues to load the other media elements referenced in the database record. As far as the user is concerned, the program has just loaded another "page" of the content. By using special HTML tags in the textual content, the program can "translate" custom embedded instructions for hyperlinks. This enables the program to store commands for the "engine" in the HTML document itself. Where a conventional HTML document hyperlink would either address another HTML document, or a file, the custom tags can do this as well as refer to other records in the database, locate and display images located on the application's CD-ROM in another illustration window, load and run media components from the database and/or program CD-ROM and load Web server-based content. This display process is seamless and transparent to the user. The net result is that the user views the content of this multimedia application as one integral application, regardless of the data's origin.

3. In the case of an instruction to locate a Web page, as long as there is a "live" TCP/IP link from the user's system to the Internet, the program will load that Web page into the display window just as if it is another page of the multimedia application itself. The program is written so as to be able to "interpret" the embedded instruction in the HTML document, and figure out on the fly where it should be looking for the next media component to display.

Given the above, the content for a proposed multimedia application can be assembled into the database that drives this "engine" and appropriate links made to media content on local hardware or remote servers with ease.

An object of this invention is to provide a multimedia delivery vehicle for varied content.

Another object of the invention is to provide a multimedia delivery vehicle wherein high-bandwidth media can be stored on local devices.

Another object of the invention is to provide a multimedia delivery vehicle wherein current and time-sensitive content can be stored remotely on an Internet server.

Another object of the invention it to provide a multimedia delivery vehicle wherein varied content is accessed and displayed as one seamless multimedia application.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

For illustrative purposes the present invention is described with reference to the process generally shown in FIG. 1 and FIG. 2, the hardware configuration generally shown in FIG. 3, and the example of software code contained in the microfiche appendix hereto which is incorporated into and forms a part of this specification. It will be appreciated that the invention may vary as to configuration and details without departing from the basic concepts as disclosed herein.

Figure 1A:
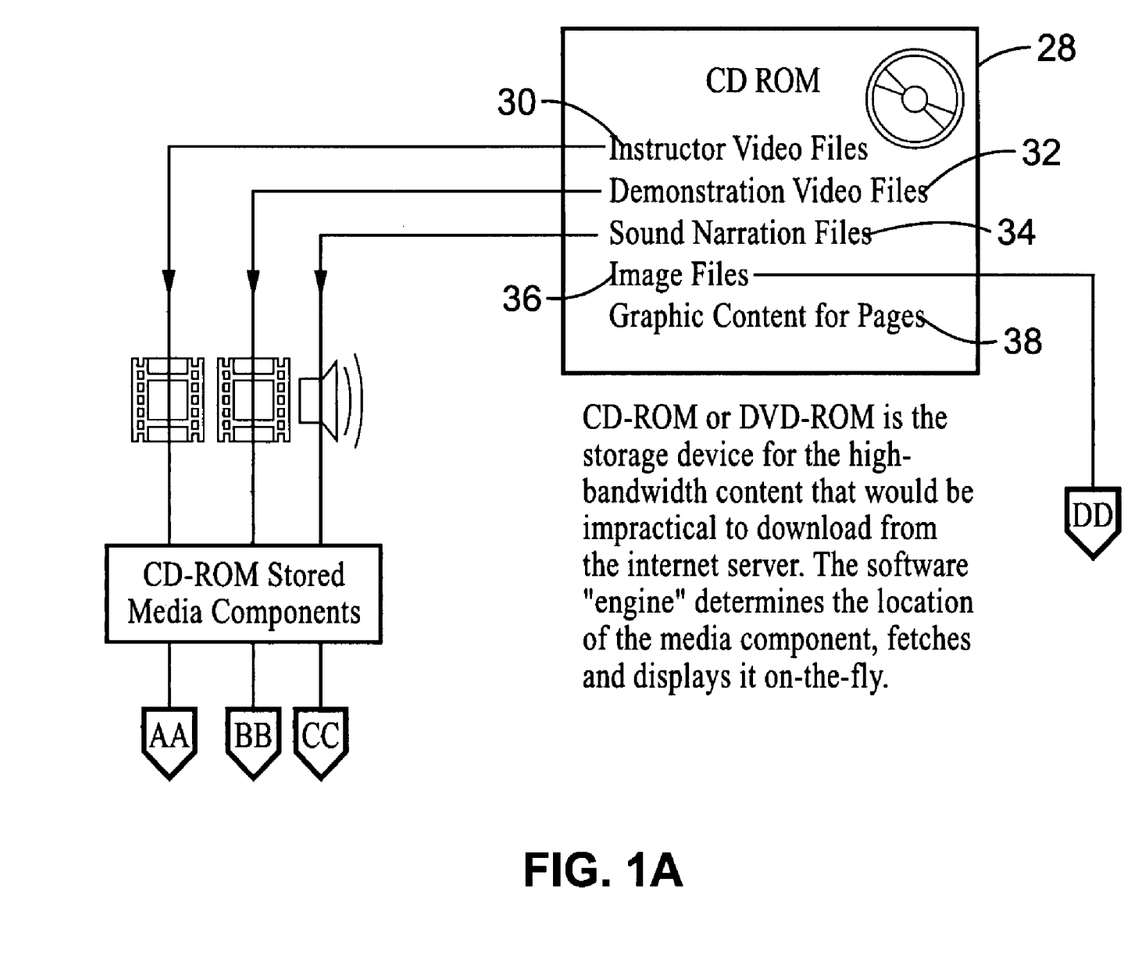
FIG. 1A through FIG. 1J is a graphical functional block and system flow diagram showing a method and apparatus for accessing and displaying varied multimedia content in accordance with the present invention.
Figure 1B:
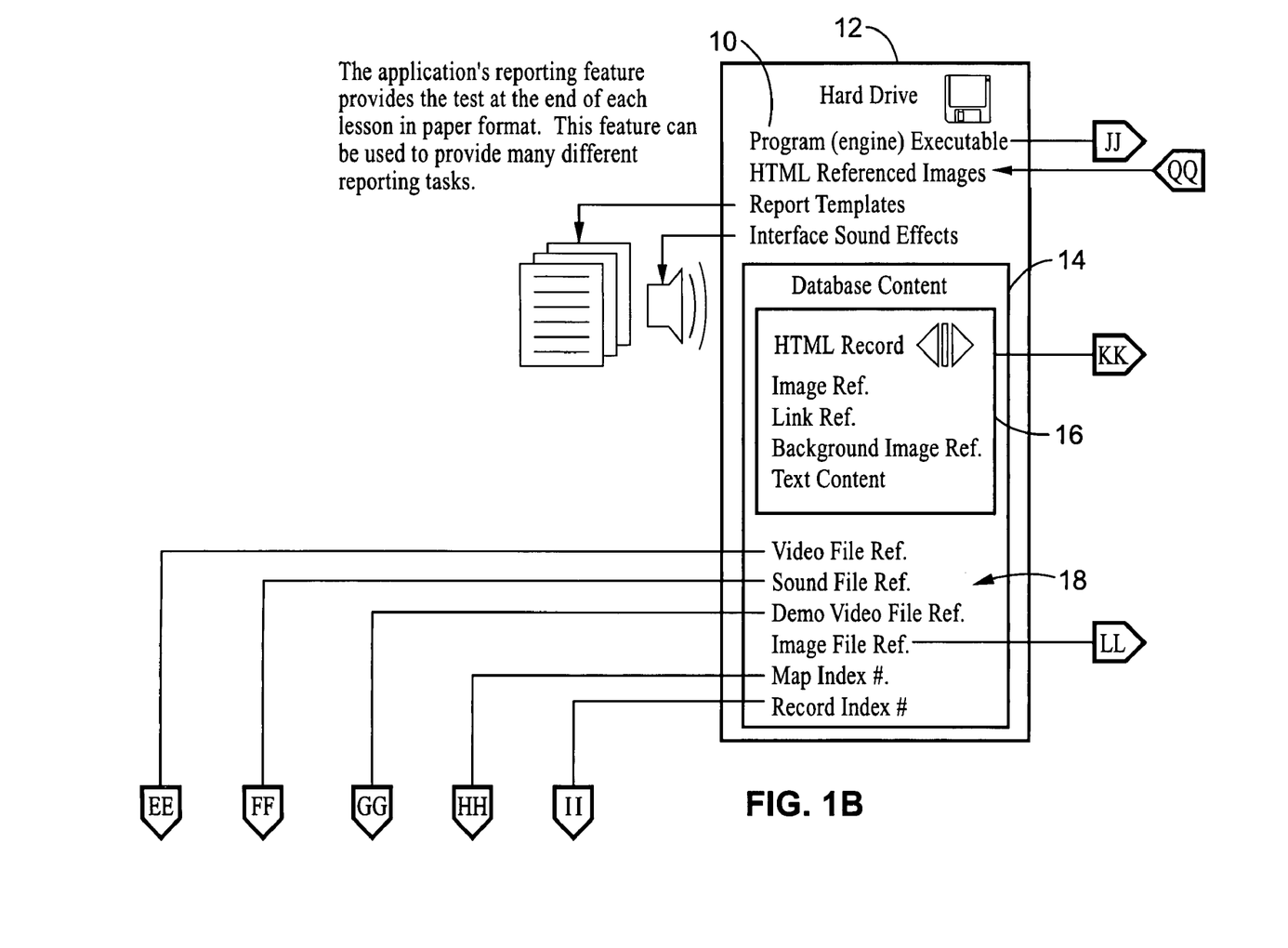
Figure 1C:
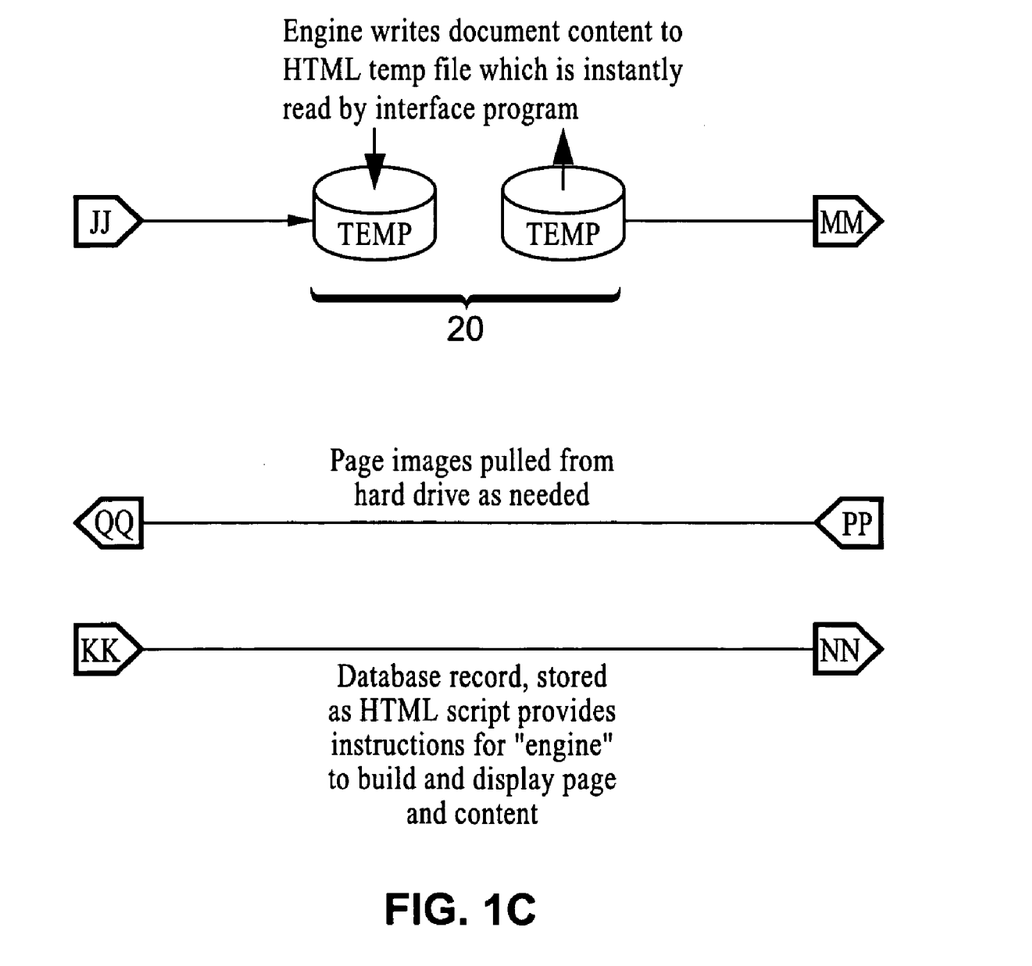
Figure 1D:
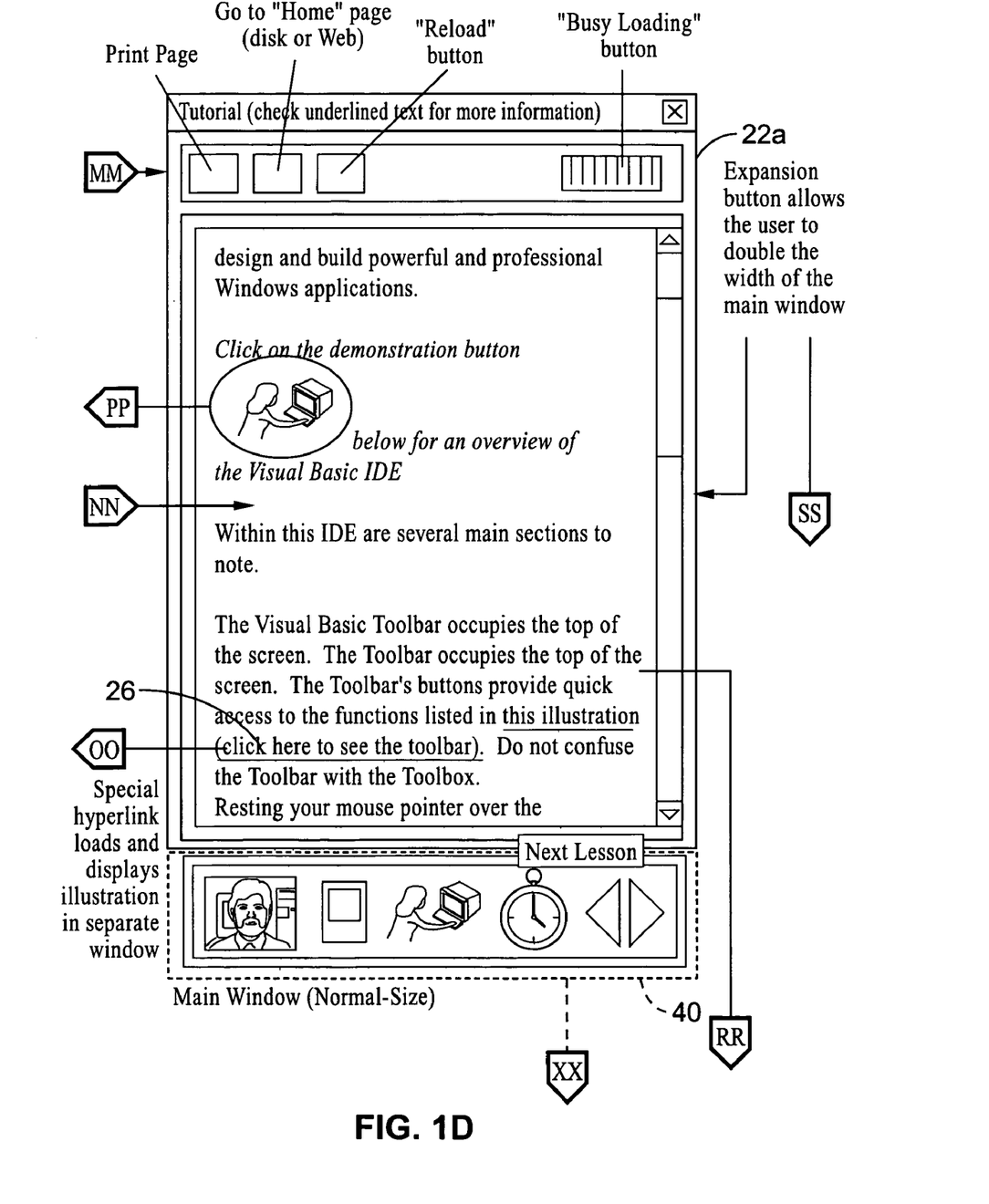
Figure 1E:
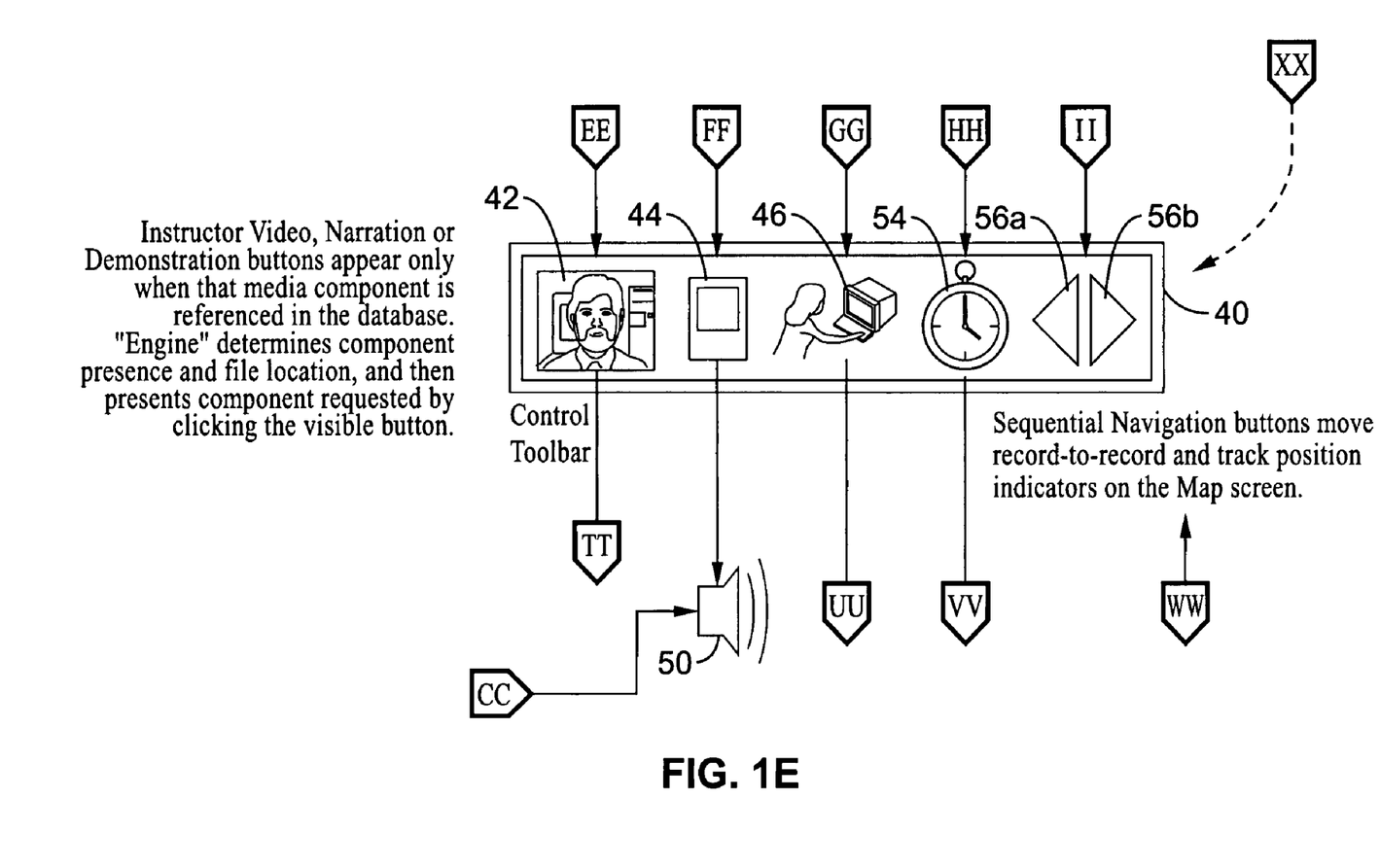
Figure 1F:
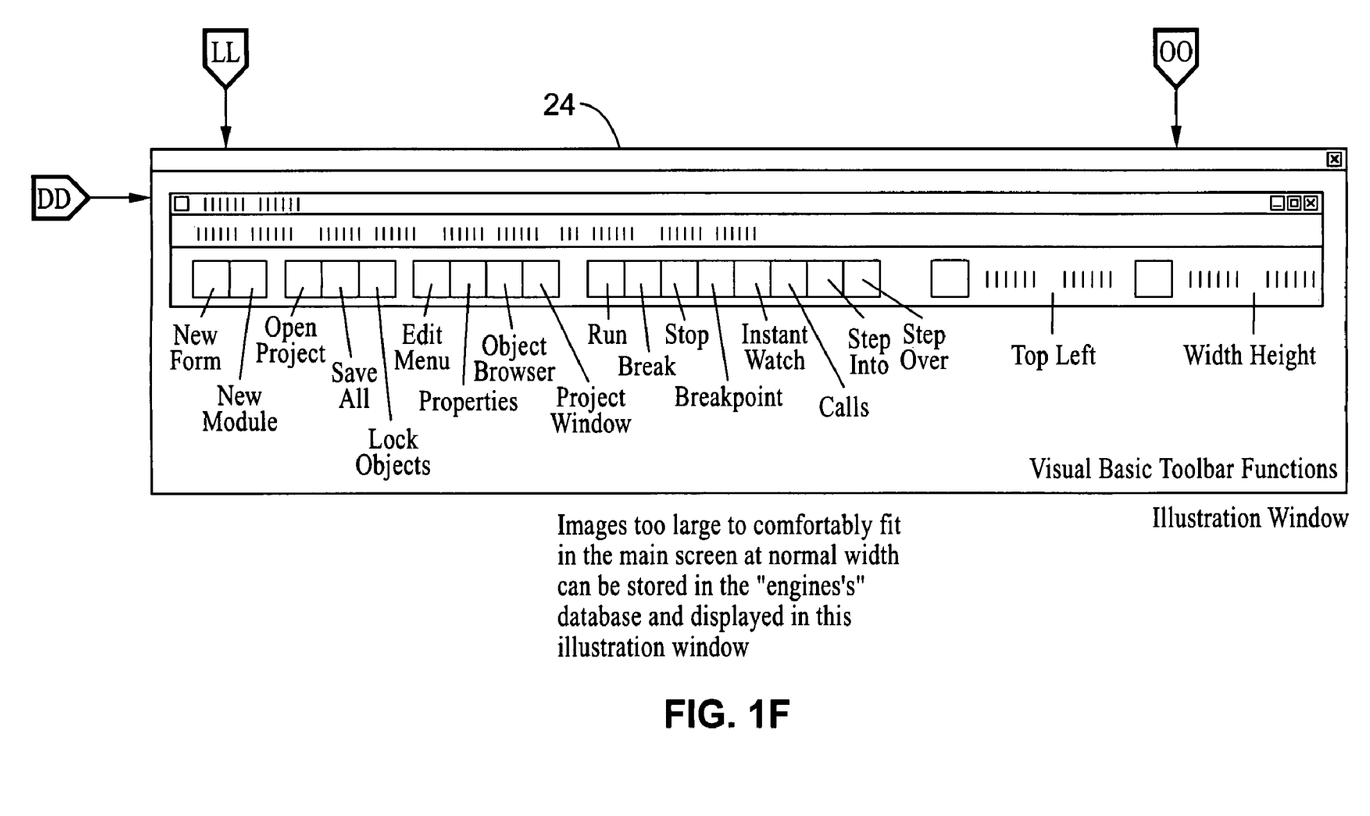
Figure 1G:
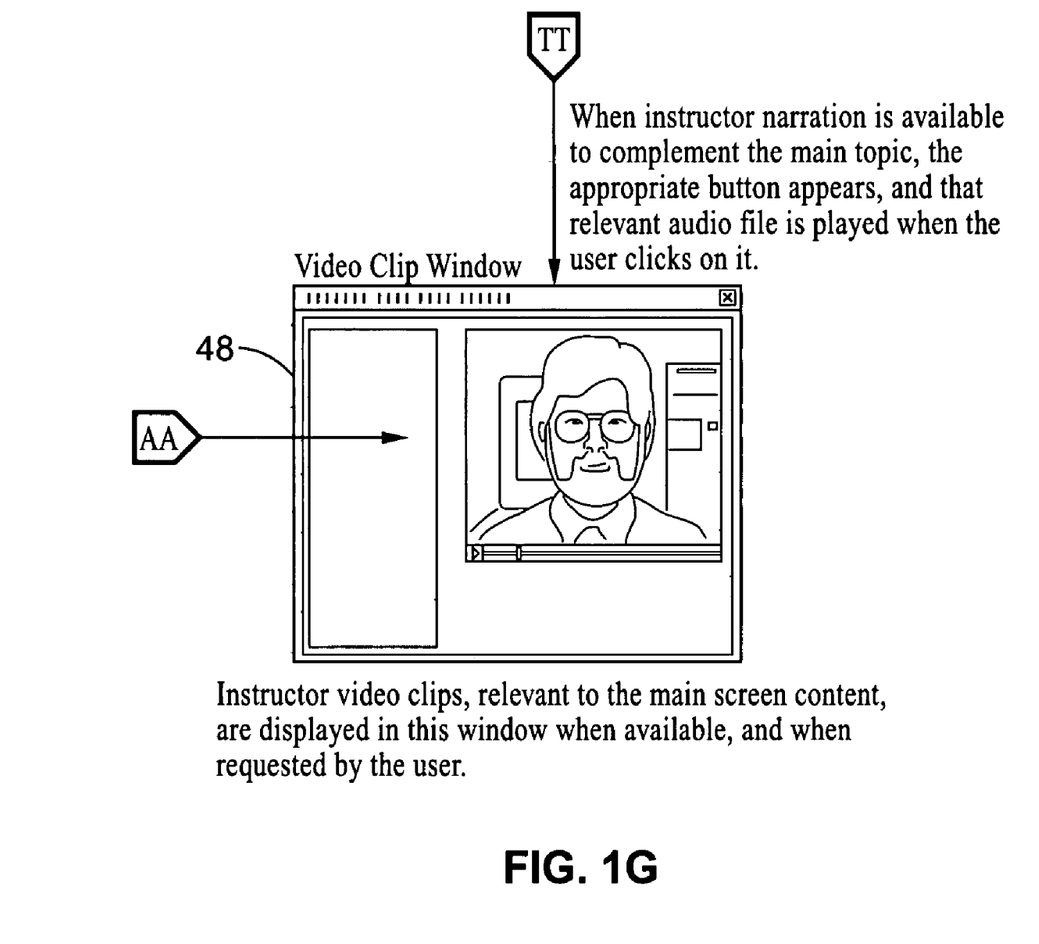
Figure 1H:
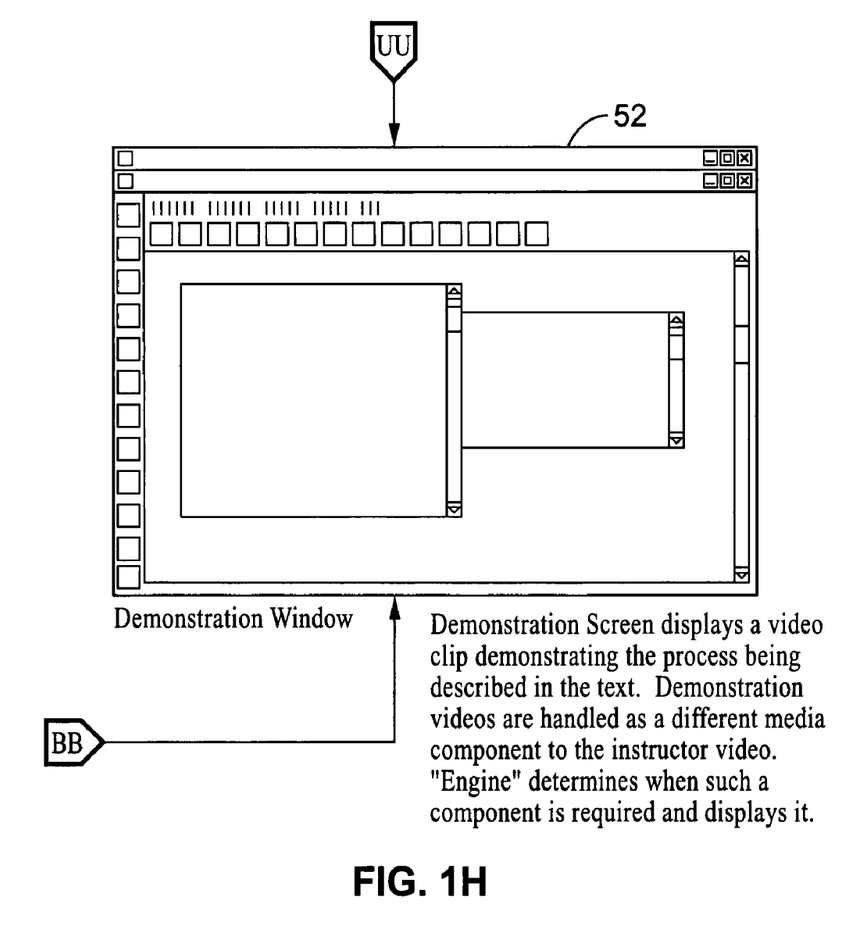
Figure 1I:
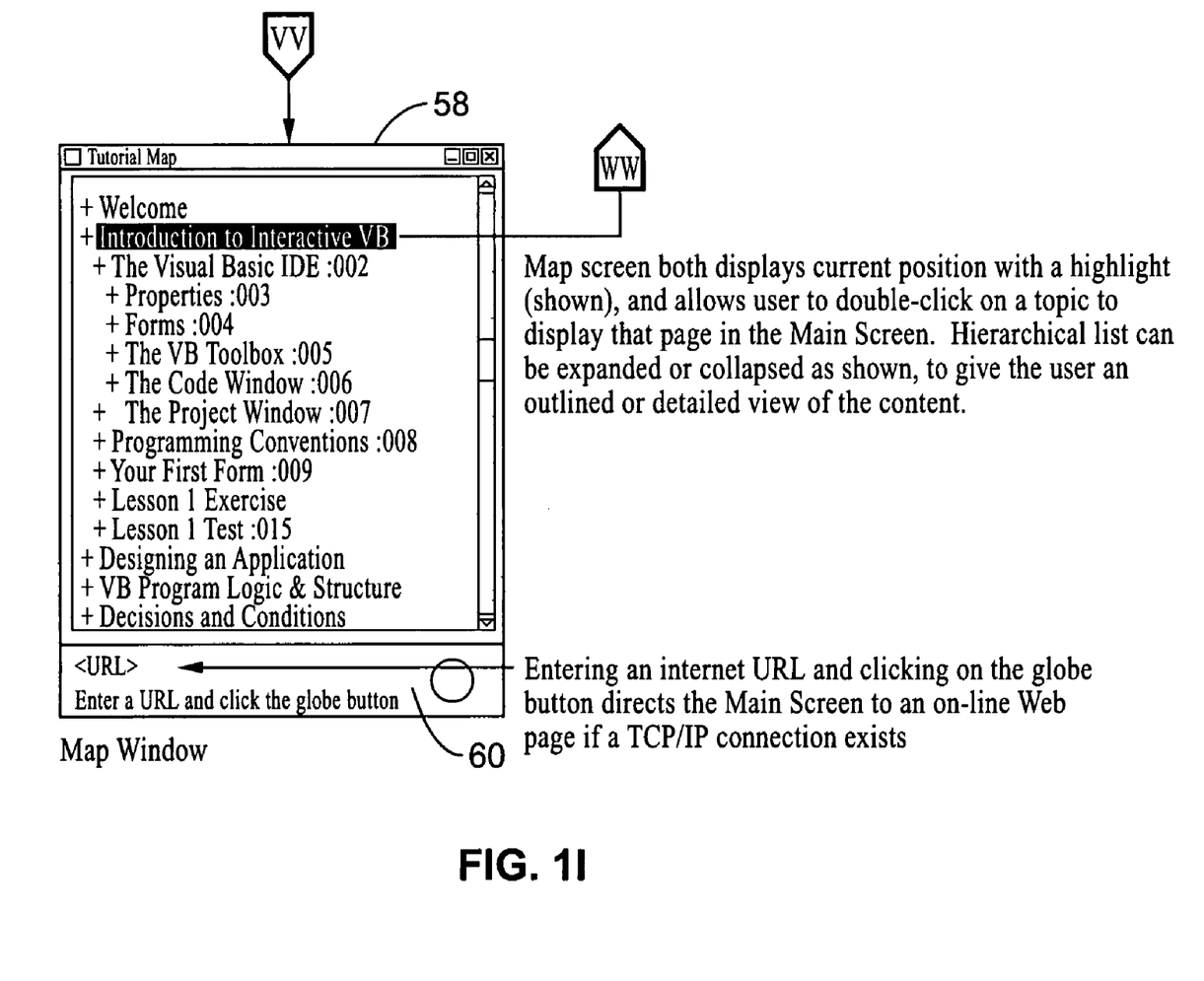
Figure 1J:
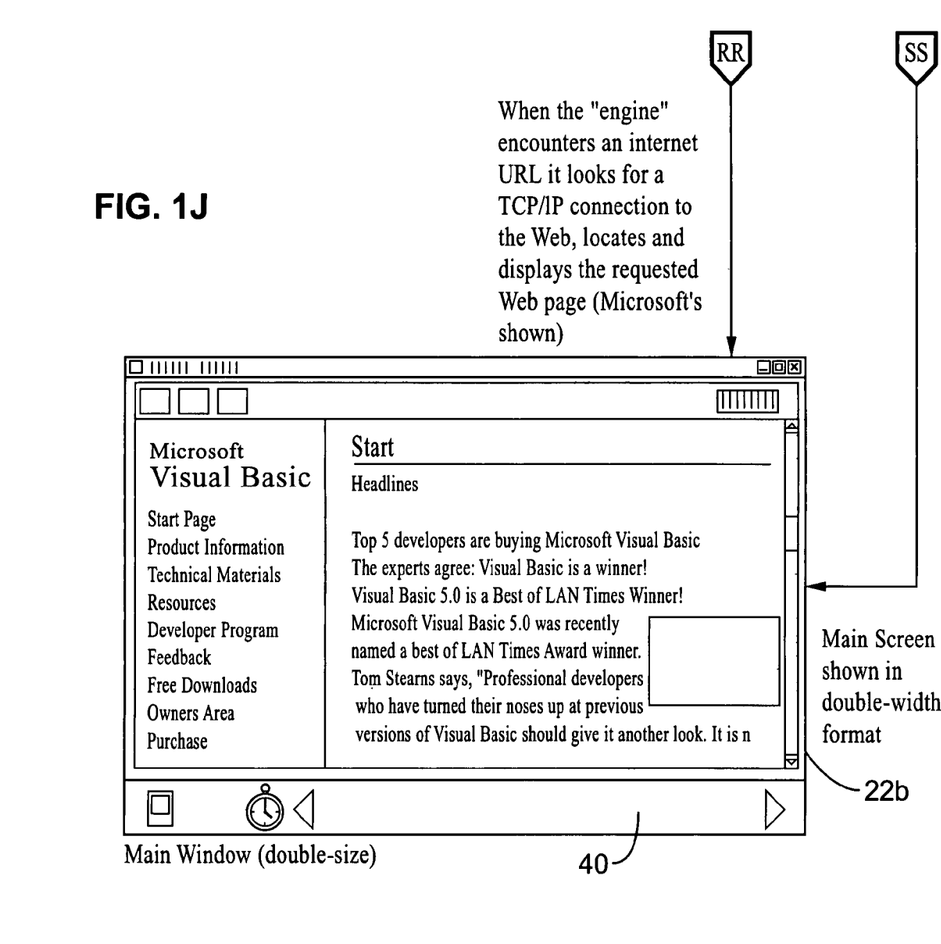

As can be seen in FIG. 1A through FIG. 1J, the present invention includes an engine 10, seen in FIG. 1B, which is a computer program stored on a mass storage device such as a hard disk drive 12. An example of code for engine 10 is shown in the microfiche appendix submitted herewith. A content database 14 associated with engine 10 stores a plurality of records 16 containing media content for the subject matter to be presented, as well as pointers 18 to the locations of media files located on CD-ROM, hard disk or other form of mass storage device, or on the Internet. The records 16 are stored in the database in the form of HTML script which provides instructions for engine 10 to build and display pages and their content. When a particular HTML record is selected, engine 10 writes that record to a temporary file as depicted in FIG. 1C, or cache 20 which is instantly read by an interface program that displays the HTML in a main display normal width window 22a as shown in FIG. 1D, or the main display expanded width window 22b as shown in FIG. 1J. Images that are too large to comfortably fit either in the main display normal width window 22a or in the main display expanded width window 22b, can be stored in a database and displayed in a separate illustration window 24 in FIG. 1F. The HTML record can contain special hyperlinks 26 as depicted in FIG. 1D which load and display those illustrations in illustration window 24.

It will be appreciated that page images are automatically loaded as needed, as are media elements referenced in the record. Also, when engine 10 encounters an Internet URL in the record, it looks for a TCP/IP connection to the Web and locates and displays the requested web page. The multimedia engine 10 of the present invention determines the location of the stored media component to be displayed, fetches the component, and displays it in real time. A CD-ROM or DVD 28 would typically serve as a storage device for high bandwidth multimedia content such as instructor video files 30, demonstration video files 32, sound narration files 34, image files 36, graphic content for pages 38, and the like, that would not be practical to download from an Internet server in real time due to download delays and server bandwidth constraints.

A button display 40, depicted in FIG. 1D and FIG. 1E, is also provided for accessing media that is referenced in the database 14 and instructor video 42, narration 44 or demonstration 46 buttons would appear on button display 40 only when that media component is referenced in the database. Engine 10 determines component presence and file location, and then presents the component requested when the user clicks the corresponding button. For example, if available, the relevant video clips from the instructor video files 30 would be displayed in a video clip window 48 when requested by the user by clicking button 42. When instructor narration is available to complement the main topic, the appropriate button 44 appears and the relevant audio file from sound narration files 34 is played on a speaker 50 when button 44 is clicked by the user. If present, button 46 would be clicked by the user and the relevant video clips from the demonstration video files 32 would be displayed in a demonstration window 52, shown in FIG. 1H, to demonstrate a process being described in related text. Note that demonstration videos would be handled as a different media component than the instructor videos, and the engine of the present invention determines when the relevant component is required and then displays the appropriate video clips.

Referring again to control toolbar 40, a map screen button 54 as well as back 56a and forward 56b navigation buttons are also provided. By clicking on map screen button 54, the user will access a map window 58, in FIG. 1I, which displays the current position in the database index with a highlight. Map window 58 will allow a user to double-click on a topic to display that page in the main display. The list is presented in a hierarchical form, which can be expanded or collapsed to give the user an outlined or detailed view of the content. Navigation buttons 56a, 56b are for sequential navigation in the map window for record-to-record movement. In addition, map window 58 includes a URL entry window 60 which allows entry of an internet URL to direct the main display to an on line Web page if a TCP/IP connection exists.

Figure 2:
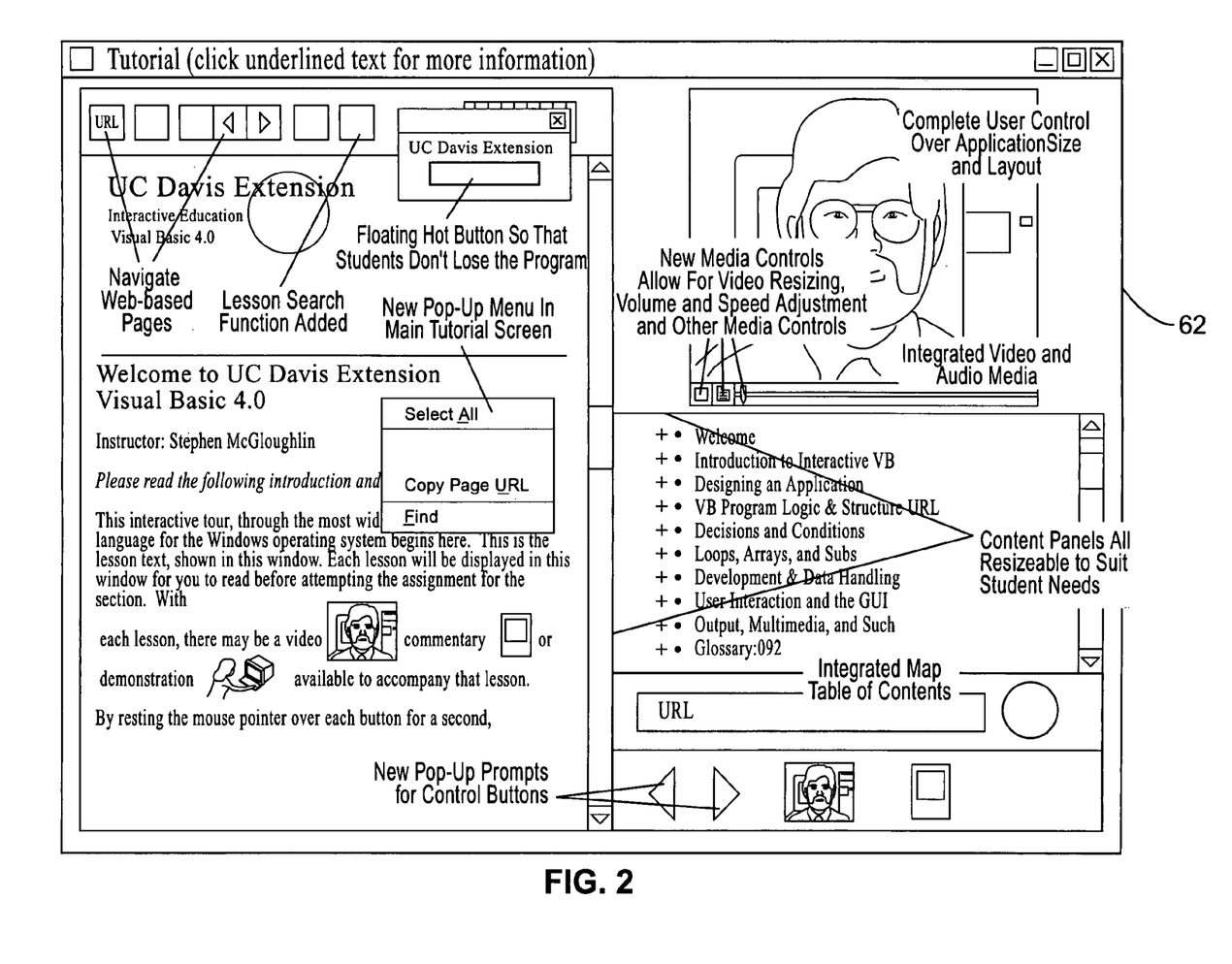
FIG. 2 is a graphical user interface for integrating the windows shown in FIG. 1A through FIG. 1J.

Referring also to FIG. 2, a graphical interface 62 is shown which integrates the individual windows described in FIG. 1. While the windows are generated as separate functions/entities in the software, they would not appear as separate windows in the graphical interface 62. Thus, it will be appreciated that the windows can be integrated on one interface as shown in FIG. 2 or as separate floating windows as shown in FIG. 1 without departing from the invention.

Figure 3:
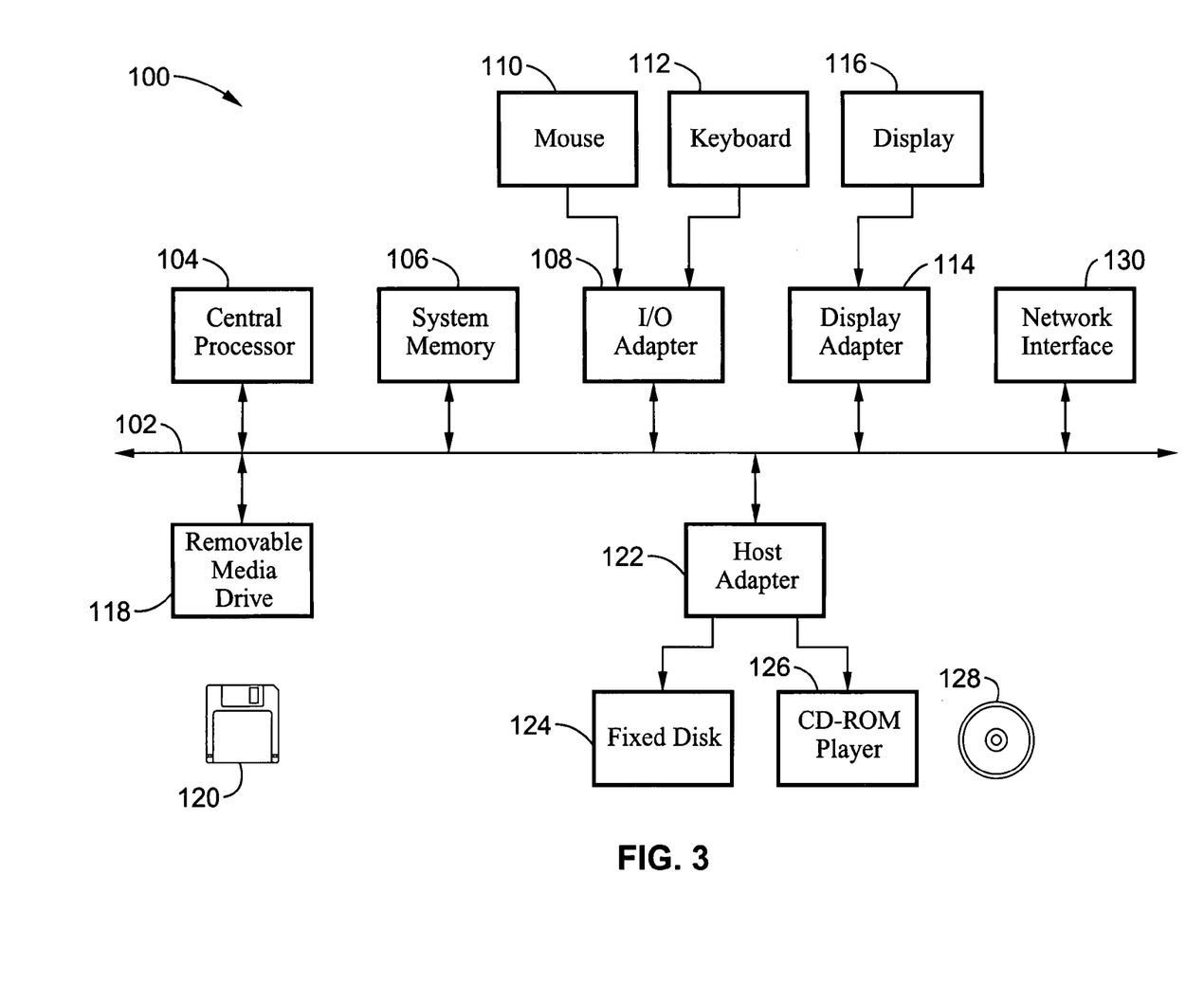
FIG. 3 is a functional block diagram of a computer system suitable for implementing the present invention.

Lastly, referring to FIG. 3, a functional block diagram of a computer system 100 suitable for implementing the present invention is shown. Such a computer system 100 typically includes a bus 102 which interconnects major subsystems such as a programmable data processor 104, system memory 106 (typically RAM), an input/output (I/O) adapter 108 to which input devices such as a mouse 110 and keyboard 112 are connected, a display adapter 114 to which a thin film transistor (TFT) or cathode ray tube (CRT) display 116 is connected, a removable media drive 118 for receiving a floppy disk or other removable media 120, a host adapter 122 connected to a fixed disk 124, a DVD or CD-ROM drive 126 for receiving a readable or read/write DVD or CD-ROM 128, or other mass storage device, and a network interface 130 for providing a connection to a local network server through an Ethernet® connection or the like, or to a remote server through a telephone link or though the Internet. Those skilled in the art will appreciate that other devices and subsystems could be included, and that the devices and subsystems shown may be interconnected in different ways than shown in FIG. 3. It will further be appreciated that not all of the devices shown are necessary to practice the present invention, and that the present invention may be implemented on any conventional computer system under processor control. Additionally, it will be understood that the operable software or code for implementing the present invention may be stored in computer readable storage media such as system memory 106, removable media 120, fixed disk 124 or CD-ROM 128.

Accordingly, it will be seen that this invention provides a multimedia delivery vehicle for varied content, wherein high-bandwidth media can be stored on local devices, current and time-sensitive content can be stored remotely on an Internet server, and varied content can be accessed and displayed as one seamless multimedia application. The content for a proposed multimedia application can be assembled into the database that drives the software engine and appropriate links made to media content on local hardware or remote servers with ease.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus for accessing and displaying multimedia content, comprising:
    (a) database means for storing multimedia content records and associated references to media files for a multimedia presentation; and
    (b) software engine means, executable on a computer, for seamlessly accessing a content record in said database means according to a record index value and locating and displaying associated media elements referred to in said indexed content record;
    wherein said software engine means is configured for interpreting embedded instructions within custom tags of said content record that direct access to other content records in said database;
    wherein said software engine means is configured for generating multiple windows and controlling within which window the media elements referred to in said content records are to be displayed;
    wherein at least one of said multimedia content records includes at least one custom tag;
    wherein said software engine is configured to read said custom tag;
    wherein said custom tag instructs said engine to fetch a corresponding multimedia content record from said database;
    wherein said software engine reads said multimedia content record; and
    wherein said at least said portion of said content page is passed to an interface program for display.

2. An apparatus as recited in claim 1:
    wherein said software engine generates a temporary local copy of at least a portion of a content page from said multimedia content record for display; and
    wherein said displayed content page contains at least one custom tag for further navigation.

3. An apparatus as recited in claim 1, wherein said seamless accessing of content records in said database does not rely on the execution of individual components of programs which operate independently to display the various media content while not providing for any integration of the applications.

4. An apparatus for accessing and displaying multimedia content, comprising:
    a database containing multimedia content records and references to media files for a multimedia presentation;
    a software engine, executable on a computer, configured for seamlessly accessing a content record in said database according to a record index value and locating and displaying media elements referred to in said content record; and
    programming executable on said software engine for, interpreting embedded instructions within custom tags of said content record for directing access to other content records in said database, generating multiple display windows within which content records are to be displayed, controlling which window of said multiple windows that media elements referred to in said content records are to be displayed;
    wherein at least one of said multimedia content records includes at least one custom tag;
    wherein said software engine is configured to read said custom tag;
    wherein said custom tag instructs said engine to fetch a corresponding multimedia content record from said database;
    wherein said software engine reads said multimedia content record; and
    wherein at least said portion of said content page is passed to an interface program for display.

5. An apparatus as recited in claim 4:
    wherein said software engine generates a temporary local copy of at least a portion of a content page from said multimedia content record for display; and
    wherein said displayed content page contains at least one custom tag for further navigation.

6. An apparatus as recited claim 4, wherein said seamless accessing of content records in said database does not rely on the execution of individual components of programs which operate independently to display the various media content while not providing for any integration of the applications.

7. An apparatus for accessing and displaying multimedia content, comprising:
    a programmable data processor;
    a database containing multimedia content records and references to media files for a multimedia presentation; and
    programming associated with said programmable data processor for, accessing, seamlessly, a content record in said database according to a record index value, locating and displaying media elements referred to in said content record, interpreting embedded instructions within custom tags of said content record for directing access to other content records in said database, generating multiple display windows within which content records are to be displayed,
    controlling which window of said multiple windows that media elements referred to in said content records are to be displayed;

wherein at least one of said multimedia content records includes at least one custom tag;
wherein said software engine is configured to read said custom tag;
wherein said custom tag instructs said engine to fetch a corresponding multimedia content record from said database;
wherein said software engine reads said multimedia content record; and
wherein said at least said portion of said content page is passed to an interface program for display.

8. An apparatus as recited in claim 7:
wherein said software engine generates a temporary local copy of at least a portion of a content page from said multimedia content record for display; and
wherein said displayed content page contains at least one custom tag for further navigation.

9. An apparatus as recited in claim 7, wherein said seamless accessing of content records in said database does not rely on the execution of individual components of programs which operate independently to display the various media content while not providing for any integration of the applications.

10. An apparatus as recited in claim 7, wherein said programming associated within said programmable data processor comprises a multimedia engine configured to locate and display all of the media elements referred to within a given content page record of said database file.

11. An apparatus as recited in claim 10, wherein said multimedia engine is configured to display media elements within one or more selected windows within said multimedia presentation.

12. An apparatus as recited in claim 11, wherein said multimedia engine is configured to display images within a main normal width display window or an expanded width window.

13. An apparatus as recited in claim 12, wherein said multimedia engine is configured to display images that are too large to comfortably fit either in said main normal width display window, or in said main display expanded width window, and can be stored in a database and displayed in a separate illustration window.

14. A computer program for accessing and displaying multimedia content, comprising:
a set of instructions stored on a media accessible by a computer and executable as programming on said computer;
wherein said programming is configured for, seamlessly accessing a content record in a database, according to a record index value, said records containing HTML content and custom tags readable by said programming, wherein one or more of said custom tags point to other content records in the database, locating and displaying media elements within one of multiple windows generated by said programming and referred to in said content record;
wherein at least one of said multimedia content records includes at least one custom tag;
wherein said software engine is configured to read said custom tag;
wherein said custom tag instructs said engine to fetch a corresponding multimedia content record from said database;
wherein said software engine reads said multimedia content record; and
wherein said at least said portion of said content page is passed to an interface program for display.

15. An apparatus as recited in claim 14:
wherein said software engine generates a temporary local copy of at least a portion of a content page from said multimedia content record for display; and
wherein said displayed content page contains at least one custom tag for further navigation.

16. An apparatus as recited in claim 14, wherein said seamless accessing of content records in said database does not rely on the execution of individual components of programs which operate independently to display the various media content while not providing for any integration of the applications.

17. A multimedia delivery apparatus, comprising:
(a) a database containing multimedia content records and references to media files for a multimedia presentation;
(b) a software delivery engine associated with said database and executable on a computer for seamlessly displaying content records accessed according to a record index value into said database; and
(c) programming within said delivery engine for, generating multiple display windows, interpreting custom tags embedded in said content records of said database, one or more of said custom tags pointing to other content records in said database, and locating and displaying within one of said multiple display windows, said content record, regardless of whether said media elements are stored on a local storage device or stored remotely on an Internet server to provide a single seamless multimedia application for displaying media elements;
wherein at least one of said multimedia content records includes at least one custom tag;
wherein said software engine is configured to read said custom tag;
wherein said custom tag instructs said engine to fetch a corresponding multimedia content record from said database;
wherein said software engine reads said multimedia content record; and
wherein said at least said portion of said content page is passed to an interface program for display.

18. An apparatus as recited in claim 17:
wherein said software engine generates a temporary local copy of at least a portion of a content page from said multimedia content record for display; and
wherein said displayed content page contains at least one custom tag for further navigation.

19. A method for displaying multimedia content, comprising:
storing in a database, multimedia content records and references to media files for a multimedia presentation;
seamlessly accessing, using a software engine executable on a computer, a content record in said database accessed according to a record index value;
interpreting custom tags embedded in said content record of said database, one or more of said custom tags pointing to other content records in said database,
generating multiple display windows; and
locating and displaying media elements referred to in said content record within one or more of said multiple display windows;
wherein at least one of said multimedia content records includes at least one custom tag;
wherein said software engine is configured to read said custom tag;

wherein said custom tag instructs said engine to fetch a corresponding multimedia content record from said database;

wherein said software engine reads said multimedia content record; and wherein said at least said portion of said content sage is passed to an interface program for display.

20. A method as recited in claim 19:

wherein said software engine generates a temporary local copy of at least a portion of a content page from said multimedia content record for display; and wherein said displayed content page contains at least one custom tag for further navigation.

21. An apparatus for accessing and displaying multimedia content, comprising:

a database containing multimedia content records and references to media files for a multimedia presentation;

a software engine, executable on a computer for seamlessly accessing a content record in said database according to a record index value and locating and displaying media elements referred to in said content record; and programming executable on said software engine for,
interpreting embedded instructions within custom tags of said content record for directing access to other content records in said database,
generating multiple display windows within which content records are to be displayed, and
controlling which window of said multiple windows that media elements referred to in said content records are to be displayed;

wherein at least one of said multimedia content records includes at least one custom tag;

wherein said software engine is configured to read said custom tag;

wherein said custom tag instructs said engine to fetch a corresponding multimedia content record from said database;

wherein said software engine reads said multimedia content record;

wherein said software engine generates a temporary local copy of at least a portion of a content page from said multimedia content record for display; and wherein said at least said portion of said content page is passed to an interface program for display.

22. An apparatus as recited in claim 21, wherein said seamless accessing of content records in said database does not rely on the execution of individual components of programs which operate independently to display the various media content while not providing for any integration of the applications.

23. A multimedia delivery engine implemented as executable routines on a computer readable media for the seamless delivery of varied multimedia content to a user, comprising:

(a) a reader routine configured to access records within a database according to a record index value;

wherein said records comprise HTML content and custom tags configured for reading by said reader routine;

(b) a display window routine for generating multiple display windows within which record content is displayed;

(c) a writing routine configured to write HTML text content of said HTML record content to a temporary cache file adapted for being read by an interface program for displaying said HTML text content in a display window;

(d) a custom HTML tag processing routine configured to,
(i) locate records in said database in response to a record index or a custom tag within a record that points to another record of said database, copy record content to a temporary cache file, and display HTML content of said temporary cache file inclusive of graphics and hyperlinks contained therein,
(ii) locate and seamlessly display images located within local storage devices within an illustration window in response to a custom tag directed at local storage resources,
(iii) load and run media components according to a custom tag from links or links within database records that are located in a local storage media or over a network connection as determined by said processing routine,
(iv) load web server-based content according to an additional custom tag; and (e) wherein varied multimedia content from local and remote storage and content of additional database records may be accessed and displayed as one seamless multimedia application.

24. A multimedia delivery engine as recited in claim 23, wherein said varied multimedia content comprises both high-bandwidth media for storage across local devices and current and time-sensitive content for storage remotely on an Internet server.

25. A multimedia delivery engine as recited in claim 24, wherein said high-bandwidth media comprises content retrieved from at least one mass storage device.

26. A multimedia delivery engine as recited in claim 23, wherein said multimedia delivery engine does not rely on the execution of individual components of programs which operate independently to display the various media content while not providing for any integration of the applications.

27. A method of delivering varied multimedia from a network enabled computer system in response to the contents of a database, comprising:

(a) accessing HTML record content within a database according to a record index value;

(b) writing HTML text content of said HTML record content to a temporary cache file adapted for being read by an interface program for displaying said HTML text content in one of multiple display windows;

(c) locating records in said database in response to a custom tag pointing to said database, copying record content to a temporary cache file, and controlling which window of said multiple windows for displaying HTML content of said temporary cache file which can include graphics and hyperlinks;

(d) locating and displaying images located within local storage devices within an illustration window in response to a custom tag directed at local storage resources;

(e) interpreting embedded instructions within custom tags of said content record for directing access to other content records in said database;

(f) loading and running media components according to a custom tag from links or links within database records that may be located in a local storage media or over a network connection; and (g) loading web server-based content according to an additional custom tag;

(h) wherein varied multimedia content from local and remote storage and content of additional database records may be accessed and displayed as one seamless multimedia application.

28. A method as recited in claim 27, wherein said varied multimedia content comprises both high-bandwidth media for storage across local devices and current and time-sensitive content for storage remotely on an Internet server.

29. A method as recited in claim 27, wherein said high-bandwidth media comprises content retrieved from at least one mass storage device.

30. A method as recited in claim 27, wherein said method does not rely on the execution of individual components of programs which operate independently to display the various media content while not providing for any integration of the applications.

31. An apparatus for providing multimedia tutorials, comprising:
- a database containing multimedia content records and references to media files for a multimedia presentation;
- a software engine, executable on a computer, said software engine seamlessly accessing a content record according to a record index value in said database and locating and displaying media elements referred to in said content record;
- programming executable on said software engine for, interpreting embedded instructions within custom tags of said content record for directing access to other content records in said database, generating multiple display windows within which content records are to be displayed, and
- controlling which window of said multiple windows that media elements referred to in said content records are to be displayed;
- wherein said software engine does not rely on the execution of individual components or programs which operate independently to display the various media content; and
- a user interface upon which content is displayed by said software engine;
- a toolbar displayed by said software engine having buttons representing the media elements available within said content record;
- wherein said toolbar provides controls for video media elements, audio media elements, and demonstration media elements;
- wherein said toolbar comprises sequence control buttons for selecting tutorial positioning within said content records; and
- wherein said toolbar comprises a map control button for selecting a map window which displays the current position of the tutorial in the database index as a highlight within said map window, and is configured for allowing the user to select a topic within said map window which the database index is to be adjusted.

32. An apparatus as recited in claim 31, wherein said software engine includes a reader portion that locates and displays all of the media elements referred to in said record of said database.

33. An apparatus as recited in claim 31, wherein said media content comprises video, audio, animation, or images.

34. An apparatus as recited in claim 31, wherein said map window display tutorial content in a hierarchical form and which is configured for being expanded or collapsed to provide a selected level of detail about the content.

35. An apparatus as recited in claim 31, further comprising a demonstration window displayed by said software engine that may be opened for demonstrating a process being described in said tutorial.

* * * * *